United States Patent
Hibino

(10) Patent No.: US 10,182,630 B2
(45) Date of Patent: Jan. 22, 2019

(54) ELECTRONIC DEVICE

(71) Applicant: KYOCERA Corporation, Kyoto-shi, Kyoto (JP)

(72) Inventor: Kouta Hibino, Daito (JP)

(73) Assignee: KYOCERA Corporation, Kyoto (JP)

( * ) Notice: Subject to any disclaimer, the term of this patent is extended or adjusted under 35 U.S.C. 154(b) by 22 days.

(21) Appl. No.: 15/220,251

(22) Filed: Jul. 26, 2016

(65) Prior Publication Data

US 2017/0027292 A1  Feb. 2, 2017

(30) Foreign Application Priority Data

Jul. 28, 2015 (JP) .................. 2015-148837

(51) Int. Cl.
*A45C 11/00* (2006.01)

(52) U.S. Cl.
CPC ......... *A45C 11/00* (2013.01); *A45C 2011/001* (2013.01); *A45C 2011/002* (2013.01); *A45C 2011/003* (2013.01)

(58) Field of Classification Search
CPC .............. A45C 11/00; A45C 2011/001; A45C 2011/002; A45C 2011/003; H04M 1/0249; H05K 5/0013; H05K 5/0221
See application file for complete search history.

(56) References Cited

U.S. PATENT DOCUMENTS

| | | | | |
|---|---|---|---|---|
| 6,134,116 A * | 10/2000 | Hoss | ......................... | E05C 1/10 |
| | | | | 292/146 |
| 8,531,830 B2 * | 9/2013 | Ho | ........................ | G06F 1/1679 |
| | | | | 248/309.1 |
| 2007/0026888 A1 * | 2/2007 | Zhou | ................... | H01M 2/1066 |
| | | | | 455/550.1 |
| 2016/0179144 A1 * | 6/2016 | Liu | ....................... | G06F 1/1675 |
| | | | | 361/679.55 |

FOREIGN PATENT DOCUMENTS

JP  2012-234944 A  11/2012

* cited by examiner

*Primary Examiner* — Robert J Hoffberg
*Assistant Examiner* — Hung Q Dang
(74) *Attorney, Agent, or Firm* — Procopio Cory Hargreaves and Savitch LLP

(57) ABSTRACT

An electronic device includes a case and a cover. The cover includes a hook to be engaged with the case. The case includes a receiving portion for receiving the hook. An end of the hook is configured to laterally extend from a body of the hook. The first portion is engaged with the end. The second portion is located at an opposite side of the end and supports the cover thereon. The second portion is softer than the hook.

8 Claims, 10 Drawing Sheets

ELECTRONIC DEVICE

CROSS-REFERENCE TO RELATED APPLICATION

The present application claims priority under 35 U.S.C. § 119 to Japanese Patent Application No. 2015-148837, filed on Jul. 28, 2015, entitled "ELECTRONIC DEVICE." The content of which is incorporated by reference herein in its entirety.

FIELD

The present disclosure relates to an electronic device.

BACKGROUND

A portable terminal having a structure for attaching a cover is known.

SUMMARY

An electronic device based on the present disclosure includes a case including a first portion and a second portion, and a cover configured to be attached to the case. The cover includes a hook configured to be engaged with the case. The case includes a receiving portion configured to receive the hook. An end of the hook is configured to laterally extend from a body of the hook. The first portion is configured to be engaged with the end. The second portion is located at an opposite side of the end and supports the cover thereon. The second portion is softer than the hook.

The foregoing and other objects, features, aspects and advantages of the present disclosure will become more apparent from the following detailed description of the present disclosure when taken in conjunction with the accompanying drawings.

DETAILED DESCRIPTION

The present disclosure desirably provides an electronic device which can reduce as much as possible the likelihood that a cover is opened undesirably under an impact, without degrading usability.

First Embodiment

Figure 1:
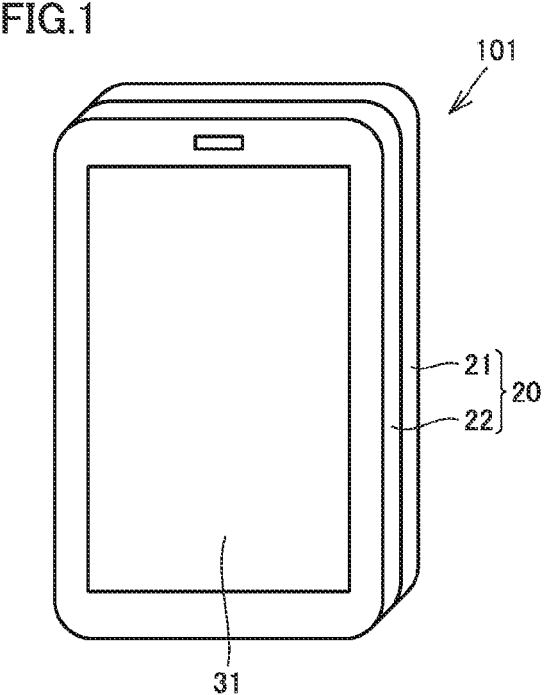
FIG. 1 is a first perspective view of an electronic device according to a first embodiment based on the present disclosure.

Referring to FIGS. 1 to 18, an electronic device according to a first embodiment based on the present disclosure will be described. FIG. 1 shows the appearance of an electronic device 101 according to the first embodiment. Although the description herein will be made assuming electronic device 101 to be a mobile phone, this is merely an example, and electronic device 101 is not limited to a mobile phone. As electronic device 101, any of various types of devices is conceivable.

As shown in FIG. 1, electronic device 101 has a display area 31 on the front side. Electronic device 101 includes a case 20. Case 20 includes a rear case member 21 and a front case member 22.

Figure 2:
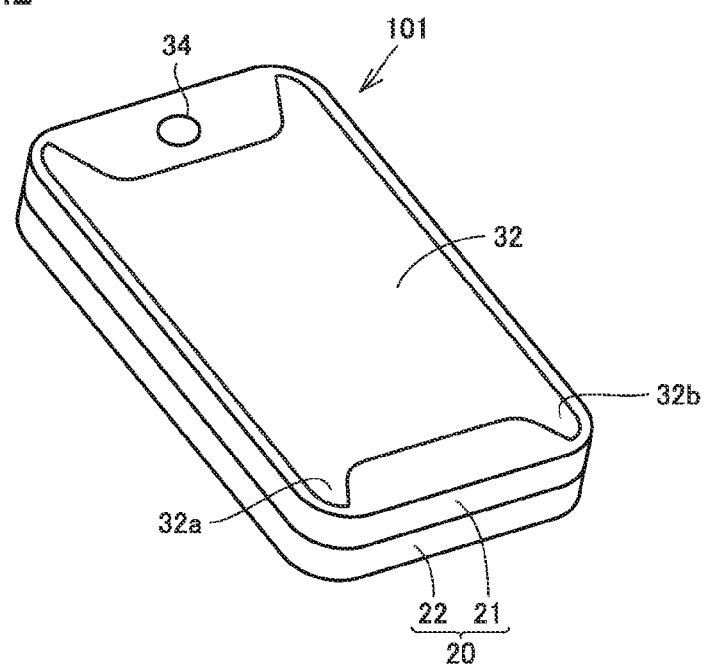
FIG. 2 is a second perspective view of the electronic device according to the first embodiment based on the present disclosure.

FIG. 2 shows a perspective view of electronic device 101 in such a posture that the rear surface thereof can be mainly seen. An image capturing unit 34, for example, may be located at one end on the rear side. A cover 32 is combined with rear case member 21. Cover 32 is intended for covering a battery stored within electronic device 101. Although the description herein will be made assuming the subject to be a battery, the battery is merely an example, and the subject is not limited to a battery. The subject may be a storage medium, for example. Even when the subject is a battery, cover 32 may also cover a mechanism for attaching/detaching a storage medium in addition to a portion storing the battery. The contour of cover 32 illustrated herein is merely an example, and is not limited to this.

Figure 3:
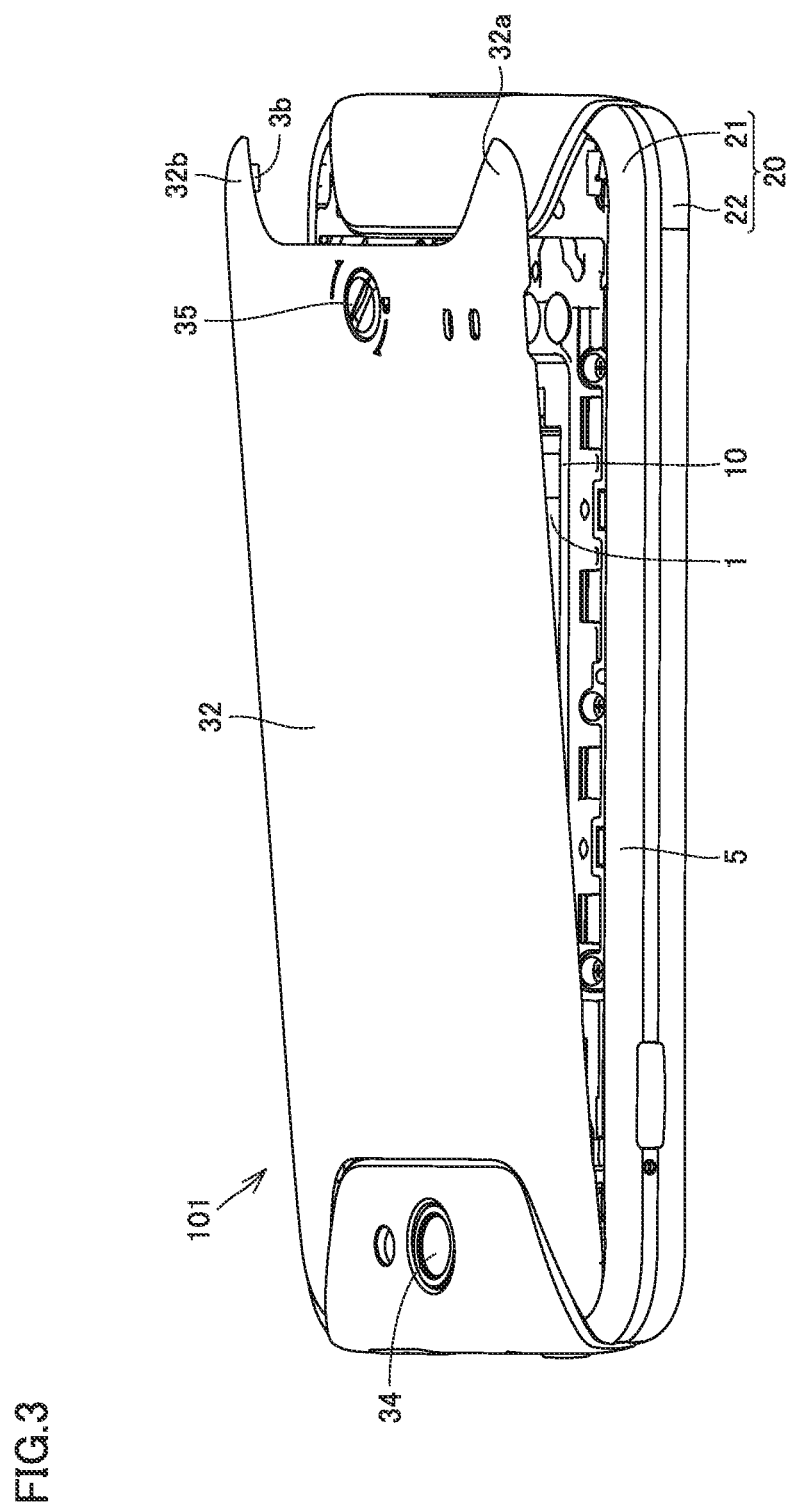
FIG. 3 is a perspective view of the electronic device according to the first embodiment based on the present disclosure with a cover slightly opened.

FIG. 3 shows cover 32 as slightly opened. As shown in FIG. 3, cover 32 may have a screw 35 attached thereto. In this case, screw 35 is intended for determining whether or not to fix cover 32. When a user loosens screw 35, the restraint of cover 32 can be loosened, and one end of cover 32 can be raised as shown in FIG. 3. Battery 1 stored in storage portion 10 is seen slightly under cover 32. Cover 32 includes cover first portions 32a and 32b. A part of the edge of rear case member 21 serves as an outer frame 5. Outer frame 5 may be formed of an elastic body that easily absorbs a shock.

Figure 4:
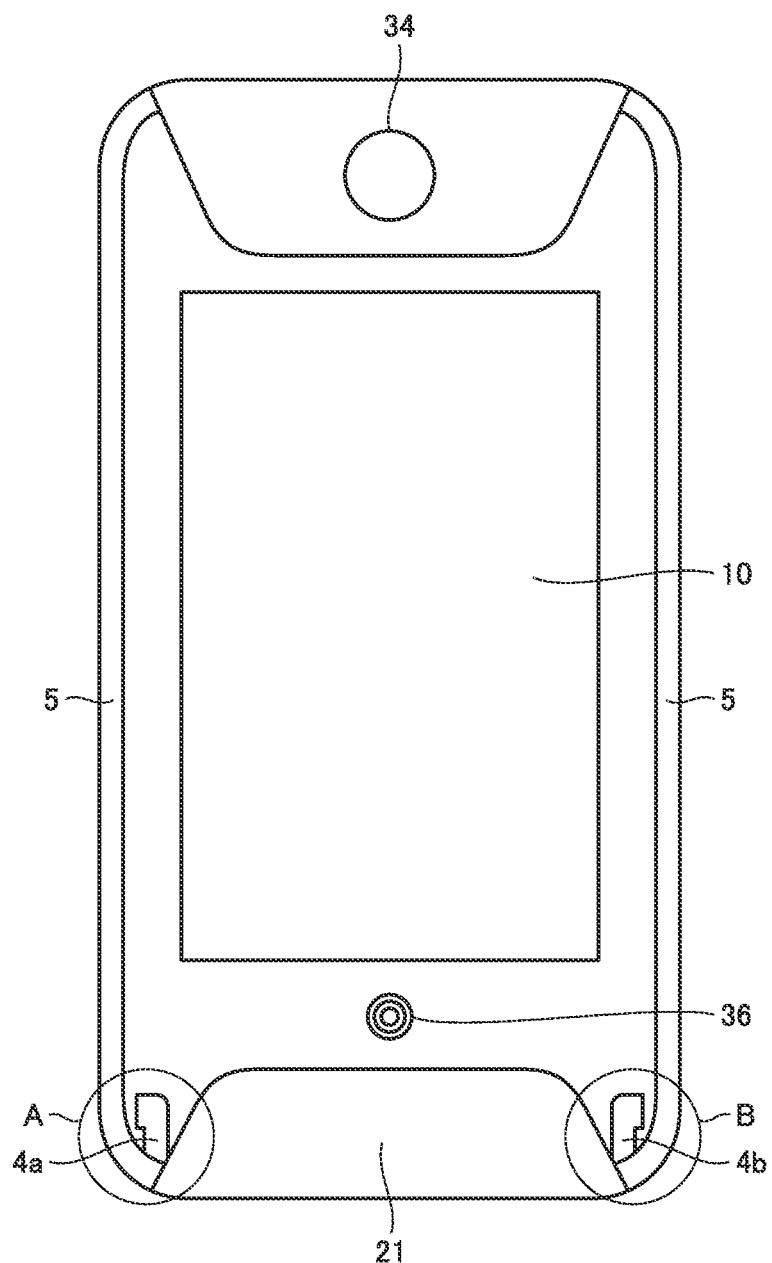
FIG. 4 is a plan view of the electronic device according to the first embodiment based on the present disclosure with the cover detached and a battery removed.
Figure 5:
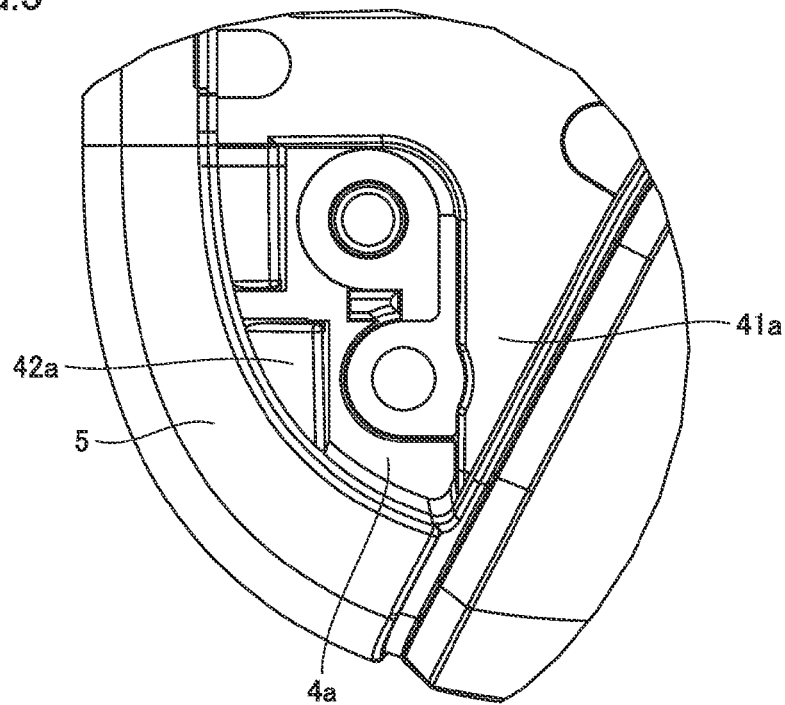
FIG. 5 is an enlarged view of a section A shown in FIG. 4.
Figure 6:
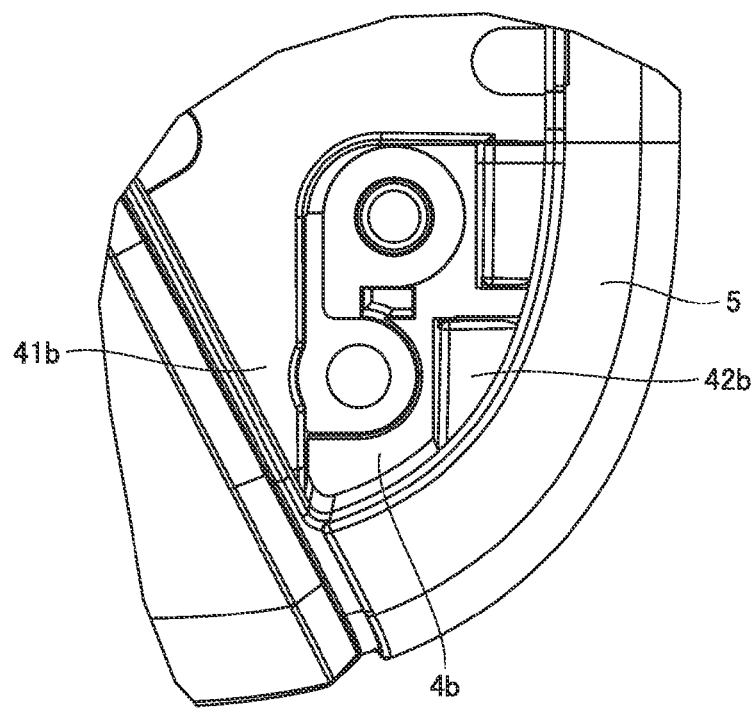
FIG. 6 is an enlarged view of a section B shown in FIG. 4.
Figure 7:
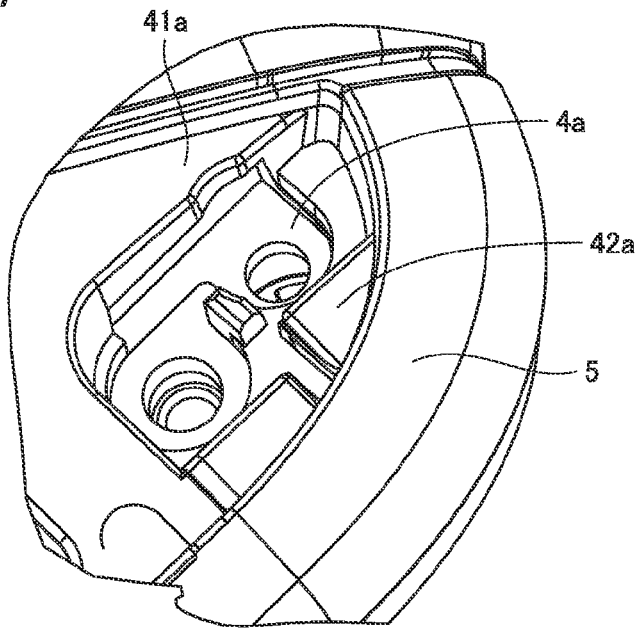
FIG. 7 is a perspective view of section A shown in FIG. 4.
Figure 8:
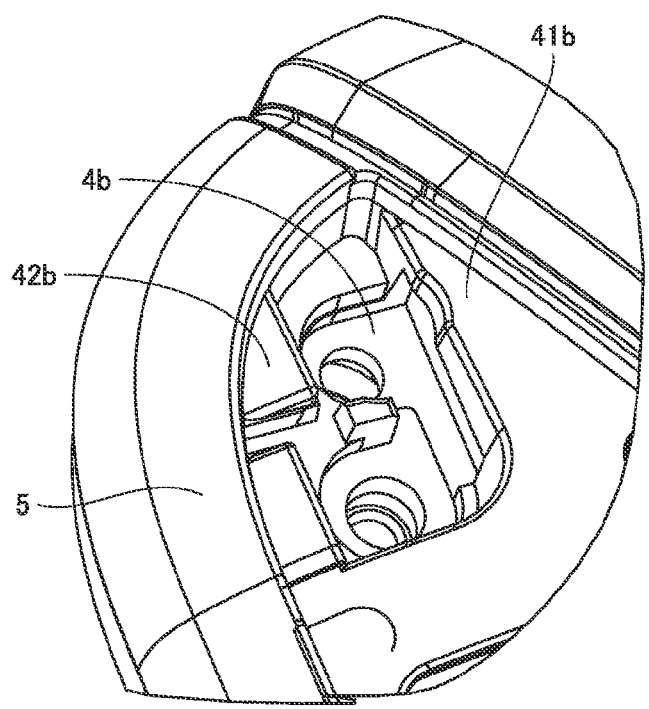
FIG. 8 is a perspective view of section B shown in FIG. 4.

FIG. 4 shows a state where cover 32 has been detached and battery 1 has been removed. Storage portion 10 is shown as occupying the center of rear case member 21. Storage portion 10 is a recess for storing battery 1. FIG. 4 also shows a screw receiving hole 36 formed in rear case member 21. Screw receiving hole 36 is a hole through which screw 35 (see FIG. 3) is inserted. As shown in FIG. 4, hook receiving portions 4a and 4b are formed in sections A and B, respectively. FIG. 5 is an enlarged view of section A. FIG. 6 is an enlarged view of section B. FIGS. 7 and 8 are perspective views of sections A and B, respectively.

As shown in FIGS. 5 and 7, hook receiving portion 4a is formed in section A as a recess or a through-hole, and a case first portion 41a and a case second portion 42a are opposed to each other with hook receiving portion 4a interposed therebetween. Each of case first portion 41a and case second portion 42a is a part of rear case member 21. Since rear case member 21 is a part of case 20, each of case first portion 41a and case second portion 42a can also be considered as being a part of case 20.

As shown in FIGS. 6 and 8, hook receiving portion 4b is formed in section B as a recess or a through-hole, and a case first portion 41b and a case second portion 42b are opposed to each other with hook receiving portion 4b interposed therebetween. Each of case first portion 41b and case second portion 42b is a part of rear case member 21. Since rear case member 21 is a part of case 20, each of case first portion 41b and case second portion 42b can also be considered as being a part of case 20.

Figure 9:
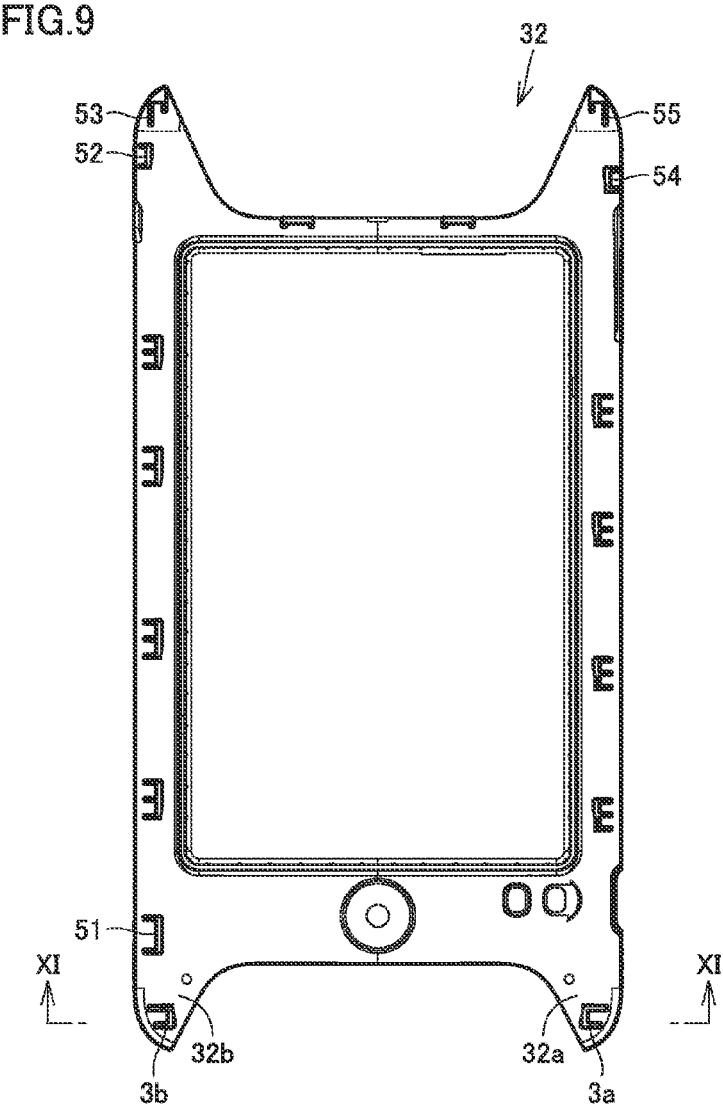
FIG. 9 is a plan view of the cover of the electronic device according to the first embodiment based on the present disclosure as seen from the back side.
Figure 10:
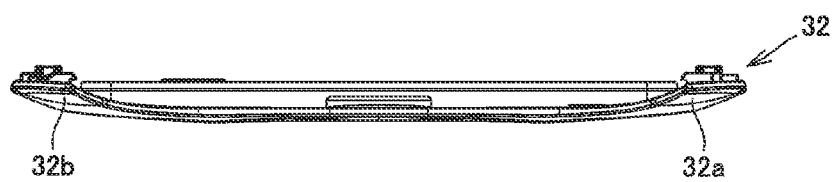
FIG. 10 is a side view of the cover of the electronic device according to the first embodiment based on the present disclosure.
Figure 11:
FIG. 11 is a cross sectional view taken along the line XI-XI shown in FIG. 9.

FIG. 9 shows cover 32 as seen from the back side. The back side of cover 32 refers to the side facing storage portion 10 (see FIG. 4). Cover first portion 32a of cover 32 has a hook 3a formed thereon. Cover first portion 32b of cover 32 has a hook 3b formed thereon. In addition to hooks 3a and 3b, cover 32 has formed thereon a first hook 51, a second hook 52, a third hook 53, a fourth hook 54, and a fifth hook 55 in a projecting manner. The number, arrangement and shape of the hooks shown herein are merely examples, and are not limited to those illustrated herein. FIG. 10 shows cover 32 as seen from the lower side of FIG. 9. FIG. 11 is a cross sectional view taken along the line XI-XI shown in FIG. 9.

Figure 12:
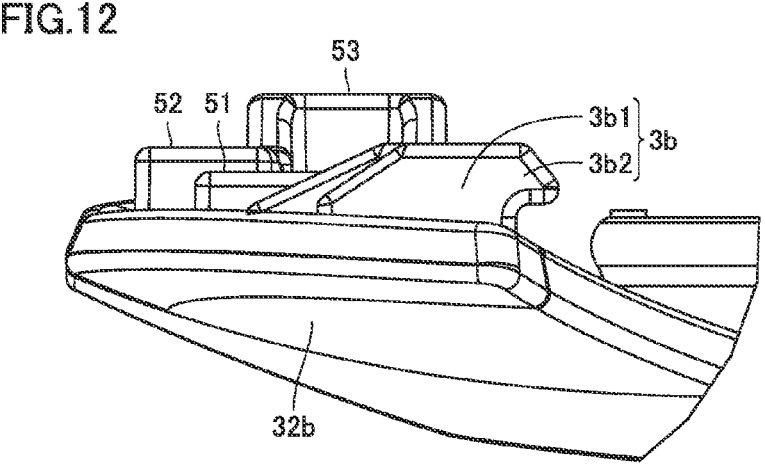
FIG. 12 is an enlarged view of a left end portion shown in FIG. 10.
Figure 13:
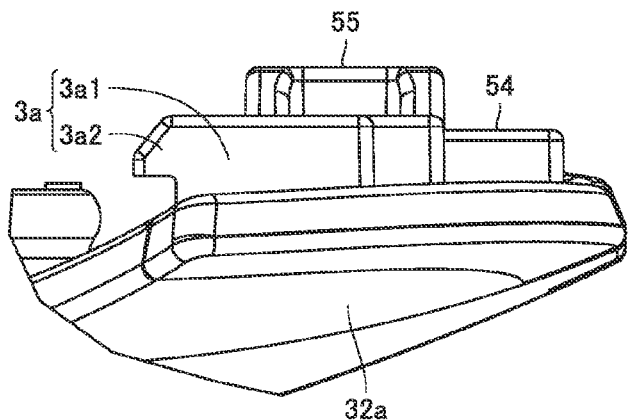
FIG. 13 is an enlarged view of a right end portion shown in FIG. 10.
Figure 14:
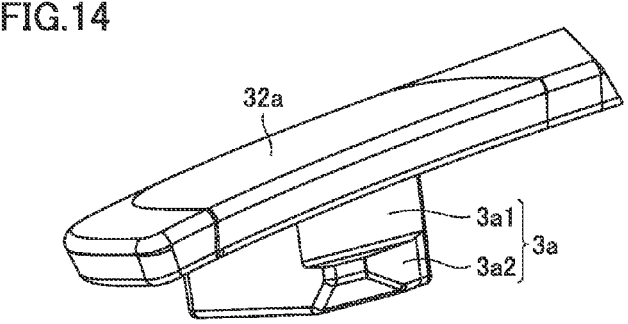
FIG. 14 is a perspective view of and around a first cover first portion of the electronic device according to the first embodiment based on the present disclosure.
Figure 15:
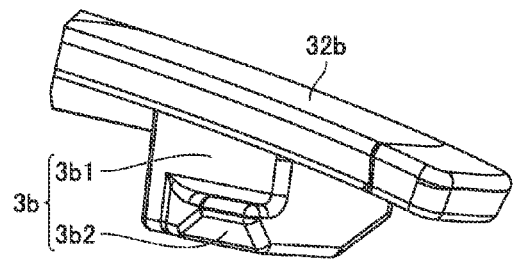
FIG. 15 is a perspective view of and around a second cover first portion of the electronic device according to the first embodiment based on the present disclosure.

FIG. 12 is an enlarged view of a left end portion shown in FIG. 10. This corresponds to cover first portion 32b to be combined with section B in FIG. 4. FIG. 13 is an enlarged view of a right end portion shown in FIG. 10. This corresponds to cover first portion 32a to be combined with section A in FIG. 4. FIG. 14 is a perspective view of and around cover first portion 32a. FIG. 15 is a perspective view of and around cover first portion 32b.

Hook 3a includes a hook body 3a1 and a hook leading end 3a2. Hook leading end 3a2 is a laterally projecting portion.

Hook 3b includes a hook body 3b1 and a hook leading end 3b2. Hook leading end 3b2 is a laterally projecting portion.

Figure 16:
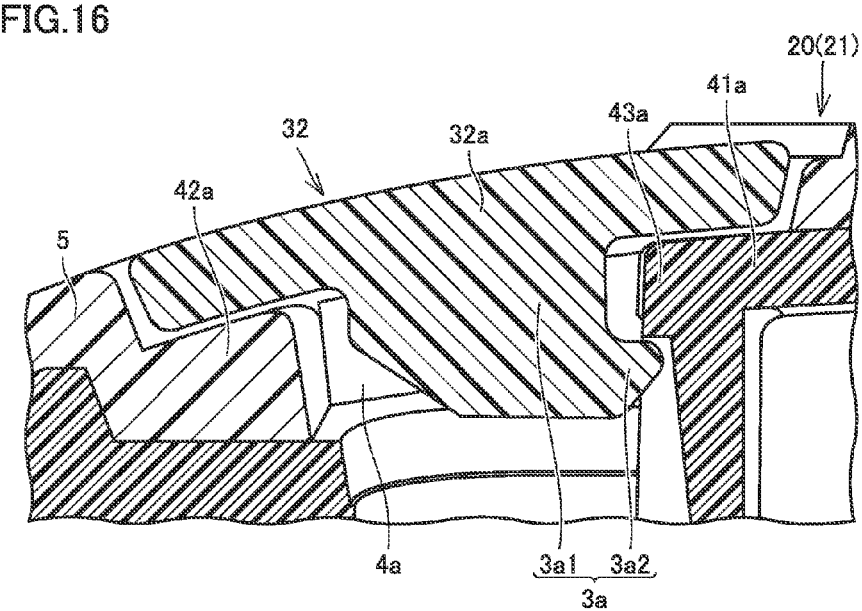
FIG. 16 is a first cross sectional view of and around the first cover first portion with the cover attached to a rear case member.
Figure 17:
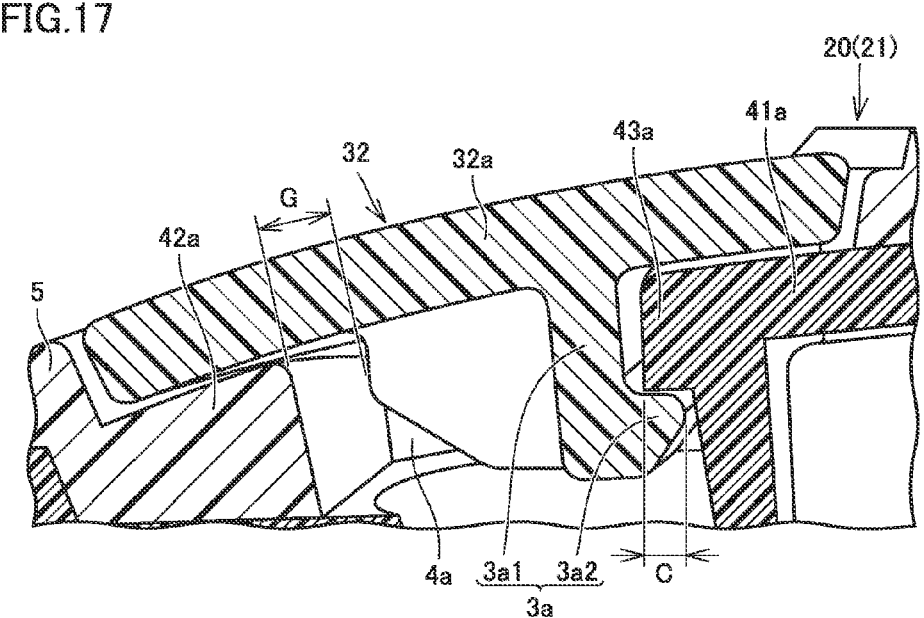
FIG. 17 is a second cross sectional view of and around the first cover first portion with the cover attached to the rear case member.
Figure 18:
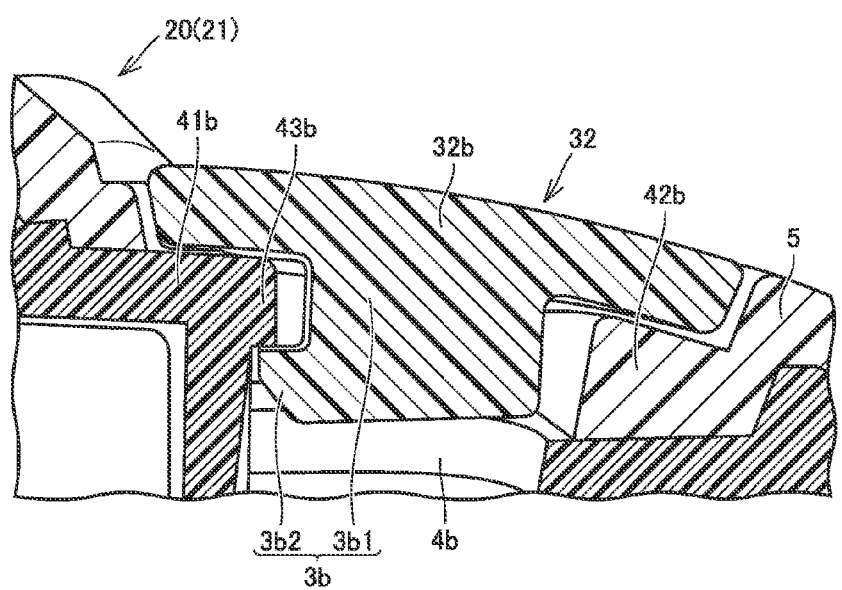
FIG. 18 is a cross sectional view of and around the second cover first portion with the cover attached to the rear case member.

FIGS. 16 and 17 are first and second cross sectional views of and around cover first portion 32a with cover 32 attached to rear case member 21, respectively. FIG. 18 is a cross sectional view of and around cover first portion 32b with cover 32 attached to rear case member 21.

The above description has been made on the assumption that hooks 3a and 3b are located to be opposed to each other separately in two cover first portions 32a and 32b, respectively. Hereinafter, one of two cover first portions 32a and 32b, namely, cover first portion 32a and its neighborhood will be focused, the details of the present disclosure will be reorganized and described.

Electronic device 101 according to the first embodiment includes case 20 having storage portion 10 which is a recess for storing battery 1 which is a subject, and includes cover 32 to be attached to case 20 so as to close storage portion 10 with battery 1 stored in storage portion 10 (see FIG. 2). As seen in plan view, cover 32 has cover first portion 32a extending in a region different from storage portion 10 while overlapping case 20 (see FIG. 3). Cover 32 includes a cover body and hook 3a extending from the cover body to be engaged with case 20. Cover first portion 32a is a part of the cover body. Hook 3a extends particularly from cover first portion 32a of the cover body (see FIGS. 13 and 14). Case member 20 has hook receiving portion 4a for receiving hook 3a (see FIGS. 5 and 7). Hook 3a has hook body 3a1 extending from the cover body toward the back of hook receiving portion 4a and hook leading end 3a2 extending laterally from hook body 3a1. Case member 20 has case first portion 41a to be engaged with at least a part of hook leading end 3a2 when hook 3a is received in hook receiving portion 4a, and has case second portion 42a located at the opposite side of hook leading end 3a2 of hook body 3a1 and carrying a part of cover 32 thereon. Case first portion 41a and case second portion 42a are opposed to each other with hook receiving portion 4a interposed therebetween. Case second portion 42a is softer than hook 3a.

The expression "B is softer than A" as used herein may indicate that, comparing the Young's modulus of a material constituting A with that of a material constituting B, the material constituting B has a smaller Young's modulus. Alternatively, it may indicate that, considering not only the properties of the materials themselves but also the shape of each of A and B, B is more likely to be deformed. This may be determined by which of A and B is deformed to a greater degree when pressed. The expression that case second portion 42a is softer than hook 3a may indicate that, for example, when hook 3a is advanced relatively along such a path that hook 3a will hit case second portion 42a, case second portion 42a is pressed by hook 3a to be deformed to allow hook 3a to pass.

Cover first portion 32a and case second portion 42a may each be formed of resin. For example, cover first portion 32a may be formed of polycarbonate (PC), and case second portion 42a may be formed of thermoplastic polyurethane (TPU). With such a combination of materials, case second portion 42a becomes softer than cover first portion 32a. The combination of materials mentioned herein is merely an example, and is not limited to this.

According to the first embodiment, case first portion 41a and case second portion 42a have a positional relationship that they are opposed to each other with hook receiving portion 4a interposed therebetween, and case second portion 42a is softer than hook 3a. An electronic device can thus be obtained which can reduce as much as possible the likelihood that the cover is opened undesirably under an impact, without degrading usability.

As described in the first embodiment, case 20 is rectangular as seen in plan view, and when cover 32 is attached to case 20, hook 3a may be located at a corner of case 20. As used herein, "rectangular" includes an approximately rectangular shape. Since hook 3a is formed in cover first portion 32a of cover 32 herein, cover first portion 32a overlaps the corner of case 20. If hook 3a is located at a corner of rectangular case 20, cover 32 can be fixed effectively to case 20 by means of hook 3a.

In FIGS. 16 and 17, it is assumed that the right side in the drawing is the front side of hook 3a and the left side in the drawing is the back side of hook 3a. A distance, namely, an allowance, between the back side surface of hook body 3a1 and a side surface of case second portion 42b is a maximum value. Maximum value G of the allowance is 0.4 mm, for example. Hook leading end 3a2 is engaged with an overhang 43a in both FIGS. 16 and 17. In FIG. 17, a distance of the engagement, namely, an engagement allowance, is a maximum value. Maximum value C of the engagement allowance is 0.4 mm, for example.

As illustrated herein, case first portion 41a may have overhang 43a overhanging to overlap at least a part of hook leading end 3a2. With such a structure having overhang 43a, hook leading end 3a2 can be engaged by a simple structure.

Maximum value C of the engagement allowance between hook leading end 3a2 and overhang 43a may be equal to maximum value G of the gap between hook body 3a1 and case second portion 42b. By adopting this structure, an electronic device can be obtained in which the cover is unlikely to be opened undesirably under an impact, while ensuring usability.

As described with reference to FIGS. 16 and 17 in the first embodiment, hook body 3a1 may be inclined at the opposite side of hook leading end 3a2 such that the height of hook body 3a1 as seen from the cover body is reduced with a distance from hook leading end 3a2. In FIGS. 16 and 17, cover first portion 32a is a part of the cover body. By adopting this structure, hook 3a can be smoothly moved into/out of hook receiving portion 4a when a user is going to open/close cover 32.

The Young's modulus of case second portion 42a may be smaller than that of hook 3a. With such a relation in terms of Young's modulus, case second portion 42a can be deformed to allow hook 3a to pass even if hook 3a interferes with case second portion 42a when opening/closing cover 32. Cover 32 can thus be opened/closed smoothly.

Case second portion 42a may be softer than case first portion 41a. For example, case first portion 41a may be formed of polycarbonate (PC), and case second portion 42a may be formed of thermoplastic polyurethane (TPU). By adopting this structure, an electronic device can be obtained which can reduce as much as possible the likelihood that the cover is opened undesirably under an impact, without degrading usability.

The Young's modulus of case second portion 42a may be smaller than that of case first portion 41a. With such a relation in terms of Young's modulus, case second portion 42a can be deformed appropriately while maintaining the rigidity of case first portion 41a. Cover 32 can thus be opened/closed smoothly.

Although the first embodiment has been described focusing on cover first portion 32a and its neighborhood, a single electronic device may include several structural sets of cover first portion 32a and its neighborhood that satisfy the conditions described above.

Cover first portion 32b, case first portion 41b, case second portion 42b, hook 3b, and hook receiving portion 4b may have a relation similar to that described above with respect to cover first portion 32a, case first portion 41a, case second portion 42a, hook 3a, and hook receiving portion 4a. As shown in FIGS. 4, 9, 11, and the like, the hook leading ends may be oriented to be opposed to each other between a plurality of cover first portions.

As shown in FIGS. 9 to 18, the cover body has a shape having a longitudinal direction as seen in plan view, and has a cover end. When imagining a central line in the cover body in parallel to the longitudinal direction, the cover end may include a cover inclined surface inclined to keep away from case 20 as the cover inclined surface approaches this central line, and hook 3a may be located on the cover inclined surface, and hook leading end 3a2 may extend from hook body 3a1 to be directed toward the central line. As used herein, "a shape having a longitudinal direction" may be approximately rectangular, for example, or may be a shape with a portion projecting from a rectangle like a peninsula as shown in FIG. 9. Although not shown in FIG. 9, the "central line" as used herein is a straight line which would be drawn in the vertical direction so as to pass through the center of cover 32. In the examples shown in FIGS. 9, 10, 13, 14, and the like, the "cover inclined surface" refers to an inclined portion of cover first portion 32a. By adopting such a structure, hook leading end 3a2 extends toward the side on which the cover inclined surface increases in height. The distance between hook leading end 3a2 and the cover body will thus be increased toward the tip of hook leading end 3a2, which makes hook 3a easy-to-use. Hook leading end 3a2 can thereby be located effectively within a limited space. Although the description herein has been focused on hook 3a existing in cover first portion 32a, the same applies to hook 3b existing in cover first portion 32b. They may have a substantially symmetrical shape. In that case, as shown in FIGS. 9 to 11, hook leading end 3a2 of hook 3a and hook leading end 3b2 of hook 3b may have a relation opposed to each other with respect to the central line. When the cover body has the cover inclined surface at the cover end, the cover body may include a curved shape as seen in cross section because of the presence of this cover inclined surface. As shown in FIGS. 10 and 11, for example, the entire cover body or both ends thereof may be gently curved. The cover body may partially have a flat portion. In the example shown in FIGS. 10 and 11, the central portion of the cover body is substantially flat, while two cover first portions 32a and 32b existing as a part of the cover body are curved. The cover inclined surface is not limited to such a curved shape that presents a bowed curve as seen in cross section, but may have such a shape that presents a straight line or a polygonal line as seen in cross section.

Second Embodiment

Figure 19:
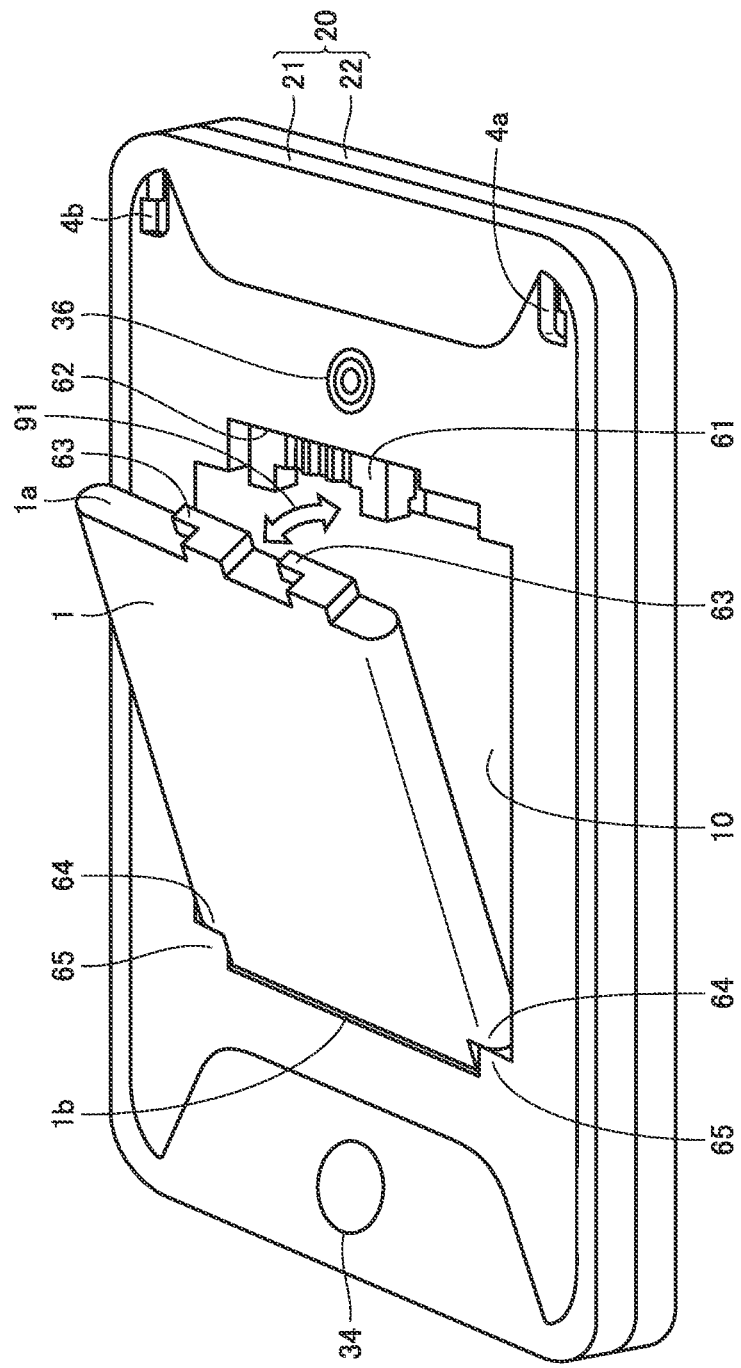
FIG. 19 illustrates how to insert/remove a subject into/from an electronic device according to a second embodiment based on the present disclosure.

Referring to FIG. 19, an electronic device according to a second embodiment based on the present disclosure will be described. The electronic device according to the second embodiment is identical to electronic device 101 described in the first embodiment in terms the basic structure. Attention will be paid to the following points.

As shown in FIG. 19, battery 1 which is a subject has a first end 1a and a second end 1b which are opposite ends. For withdrawing battery 1 from storage portion 10, first end 1a of battery 1 can be taken out from storage portion 10 using second end 1b as the axis of rotation in the state fitted in storage portion 10. Hook receiving portions 4a and 4b are formed at the corners of case 20 on a side closer to first end 1a of battery 1.

Battery 1 includes a first engaging portion 63 at first end 1a. First engaging portion 63 is engaged with a sliding member 61. Battery 1 includes second engaging portions 64 at the two corners on the side of second end 1b. Rear case member 21 includes third engaging portions 65 at the two corners of approximately rectangular storage portion 10.

Third engaging portions 65 are engaged with second engaging portions 64. In FIG. 19, the illustration of portions where first hook 51, second hook 52, third hook 53, fourth hook 54, and fifth hook 55 of rear case member 21 are fitted is omitted.

For installing battery 1 in storage portion 10, a user turns battery 1 as indicated by an arrow 91 using second end 1b as the axis of rotation with second engaging portions 64 at second end 1b of battery 1 abutted against third engaging portions 65 of storage portion 10, thereby pushing first end 1a into storage portion 10. Sliding member 61 is then moved along a sliding track 62 to lock battery 1.

For withdrawing battery 1 from storage portion 10, a user moves sliding member 61 along sliding track 62 to unlock battery 1, and turns battery 1 as indicated by arrow 91 using second end 1b as the axis of rotation, thereby raising first end 1a from storage portion 10. As shown in FIG. 19, second end 1b can be withdrawn from storage portion 10 with first end 1a raised from storage portion 10 to some extent.

When the electronic device has such a structure, first end 1a of battery 1 is likely to come out earlier than second end 1b under an impact. In the second embodiment, hook receiving portions 4a and 4b are formed at the corners of case 20 located at the side closer to such first end 1a, which can more effectively reduce the likelihood that the cover is opened undesirably under an impact.

Electronic device 101 described in the first embodiment may have the same structure as that described in the second embodiment.

Although the first and second embodiments describe approximately rectangular cover 32 having projections projecting in the longitudinal direction at the four corners as shown in FIGS. 2, 3 and 9, this is merely an example, and the cover is not limited to this shape. For example, the outline of the cover may be a simpler rectangle. Various shapes are conceivable as the shape of the cover.

In the example shown in FIG. 3, cover 32 is configured to be fixed by tightening screw 35 at a position, but this is merely an example, and the presence of such screw 35 is not indispensable. In the example shown in FIG. 3, screw 35 is located at a position on the central line, but may be located at a different place. The number of screws is not limited to one. Such screws may be located at several places. The cover may have no screw. It may be possible to fix the cover by means other than a screw.

A plurality of the above-described embodiments may be appropriately combined and adopted.

The term "electronic device" as used herein has a broad concept including, for example, a mobile phone, a personal digital assistant, a tablet terminal, a personal computer, a game machine, a television set, a portable music player, a CD player, a DVD player, an electronic dictionary, a digital book reader, a digital camera, a video camera, a radio set, a navigation system, and the like. A smartphone is included in the concept of a mobile phone or a personal digital assistant.

It should be understood that embodiments of the present disclosure described herein are illustrative and non-restrictive in every respect. The scope of the present disclosure is defined by the terms of the claims, and is intended to include any modifications within the scope and meaning equivalent to the terms of the claims.

The invention claimed is:

1. An electronic device comprising:
   a case including a first portion and a second portion with a receiving space between the first portion and the second portion; and
   a cover comprising a hook, wherein the hook comprises a hook body and a hook end, wherein the hook body is sized to fit within the receiving space, and wherein the hook end is engageable with the first portion of the case to attach the cover to the case,
   wherein the second portion is positioned, with respect to the first portion, such that, when the hook is within the receiving space, the hook end is positioned directly between a surface of the second portion and a surface of the first portion, and
   wherein the second portion is made of a material that is softer than a material from which the hook is made, such that, when the hook presses directly against the surface of the second portion, the surface of the second portion deforms to allow passage of the hook into and out of the receiving space without movement of the second portion relative to the first portion.

2. The electronic device according to claim 1, wherein the case is rectangular in plan view, and the hook is located at a corner of the cover.

3. The electronic device according to claim 1, wherein the first portion comprises an overhang, and wherein the hook end engages with the first portion by overlapping the overhang of the first portion.

4. The electronic device according to claim 3, wherein a maximum value of overlap between the hook end and the overhang of the first portion is substantially equal to a maximum value of a gap between the hook body and the second portion when the hook is within the receiving space.

5. The electronic device according to claim 1, wherein the material from which the second portion is made has a smaller Young's modulus than the material from which the hook is made.

6. The electronic device according to claim 1, wherein the material from which the second portion is made is softer than a material from which the first portion is made.

7. The electronic device according to claim 6, wherein the material from which the second portion is made has a smaller Young's modulus than the material from which the first portion is made.

8. The electronic device according to claim 1,
   wherein the cover has a shape having a longitudinal direction in plan view,
   wherein, along a central line of the cover that is parallel to the longitudinal direction, the at least one end of the cover includes an inclined surface that is inclined such that, along an axis that is orthogonal to the longitudinal direction, when the cover is attached to the case, a distance between the inclined surface and the case increases from each edge of the surface towards the central line, and
   wherein the hook is located on the inclined surface.

* * * * *